Figure 1A:
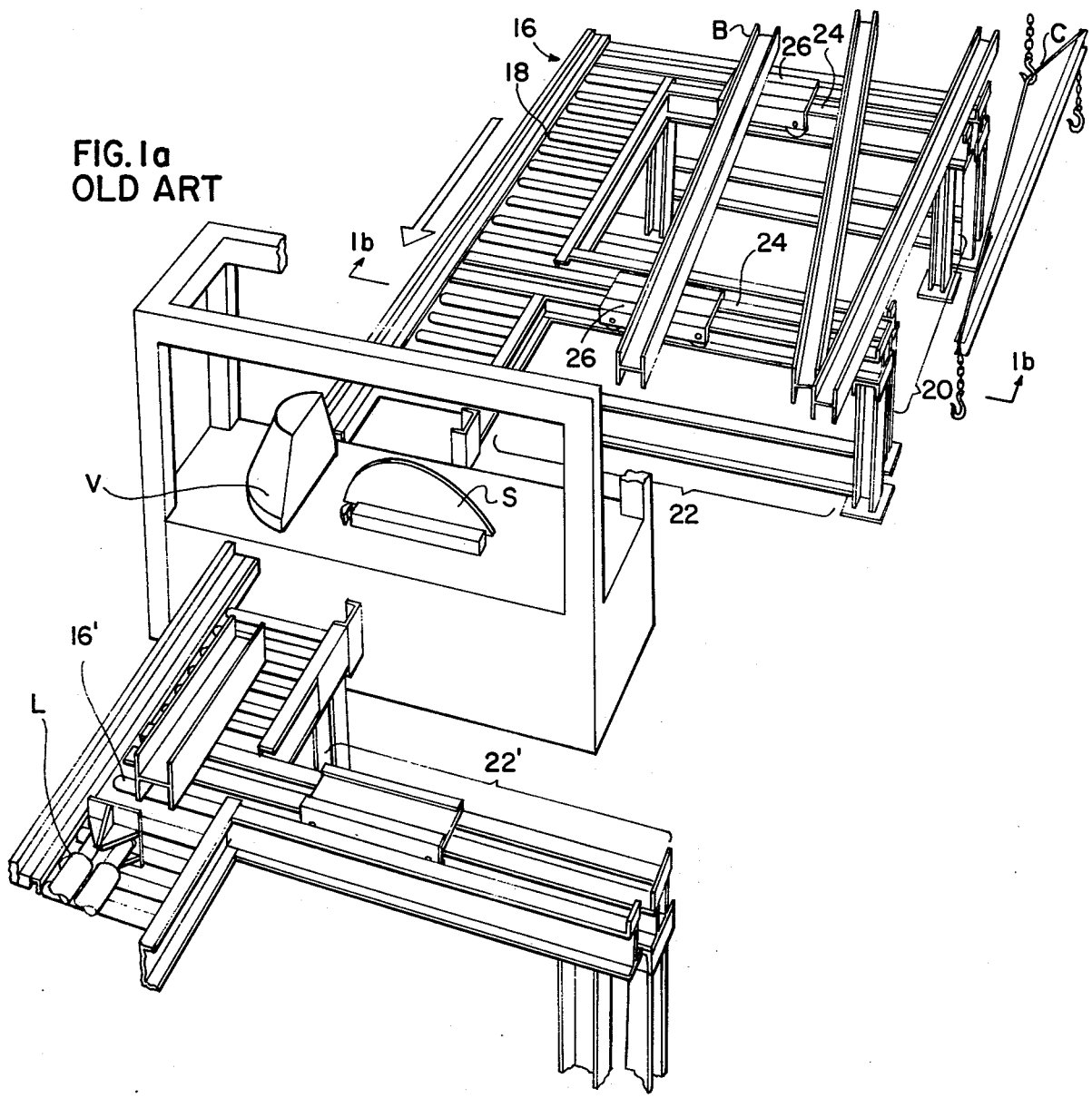

United States Patent [19]

Schmidt

[11] 4,042,118
[45] Aug. 16, 1977

[54] COMBINATION ROLLER CONVEYOR AND CROSS-CONVEYOR SYSTEM

[76] Inventor: Hans V. Schmidt, Mount Vista Road, Kingsville, Md. 21087

[21] Appl. No.: 665,372

[22] Filed: Mar. 9, 1976

[51] Int. Cl.² ............................................. B65G 47/90
[52] U.S. Cl. ................................... 214/1 BB; 104/48; 198/774; 214/1 P; 214/1.1
[58] Field of Search ............... 198/487, 773, 774, 434; 214/1 P, 1 R, 1 F, 1.1–1.5, 1 B, 1 BB; 104/48; 209/73; 144/246 R, 246 F; 271/246

[56] References Cited

U.S. PATENT DOCUMENTS 1,723,505  8/1929  Goodfellow .................... 214/1 F
3,917,078  11/1975  Schmidt ...................... 214/1 P Primary Examiner—Frank E. Werner
Attorney, Agent, or Firm—John F. McClellan, Sr.

[57] ABSTRACT

The combination of a roller conveyor and a cross-conveyor system having elevatable and depressable wagon structure for picking up structural beams from a storage table and carrying the beams to and depositing them on the conveyor, is improved by upright wagon flange structure for hooking, separating and orienting stored beams prior to pickup. In conjunction with extension of a portion of the cross conveyor structure an additional distance into or through the conveyor, the flange provides for positive alignment of beams against a guide at the conveyor prior to set-down on the conveyor.

9 Claims, 10 Drawing Figures

OLD ART

OLD ART

COMBINATION ROLLER CONVEYOR AND CROSS-CONVEYOR SYSTEM

This invention relates generally to material handling and specifically to roller conveyors and the like having cross-conveyors of the general type disclosed in U.S. Pat. No. 3,917,078 granted Nov. 4, 1975, to the present inventor.

Principal objects of this invention are to provide flanges improving elevatable and depressable cross-conveyor wagon structure to permit positive separation and preliminary alignment of beams stored in parallel juxtaposition, and to permit beams carried to a conveyor on the cross-conveyor to be aligned positively against a conveyor guide prior to being deposited on the conveyor, thus reducing wear caused by sliding rough beams across the rollers of the conveyor.

A further object is to provide by means of flanged cross-conveyor wagon structure the capability in through-type cross-conveyors storing and loading at both ends for wagons to continue in one direction, separating and preliminarily aligning a beam on a storage table, picking up and transporting the beam to the conveyor, and positively aligning the beam against the conveyor guide, reducing the number of wagon reversals required.

And still a further object of the invention is to provide conveyor wagon beds with end-flanges for improving retention of beams and reducing accidents, damage and noise.

In brief summary given for purposes of cursive description only and not as limitation, the invention includes conveyor wagon structure elevatable and depressable relative to specially related conveyor and storage means for loading, conveying and unloading beams and the like, in combination with upright flange structure on the wagon for hooking, moving and aligning structural beams and the like, both when the structural beams are on and are off the wagon.

Figure 1B:
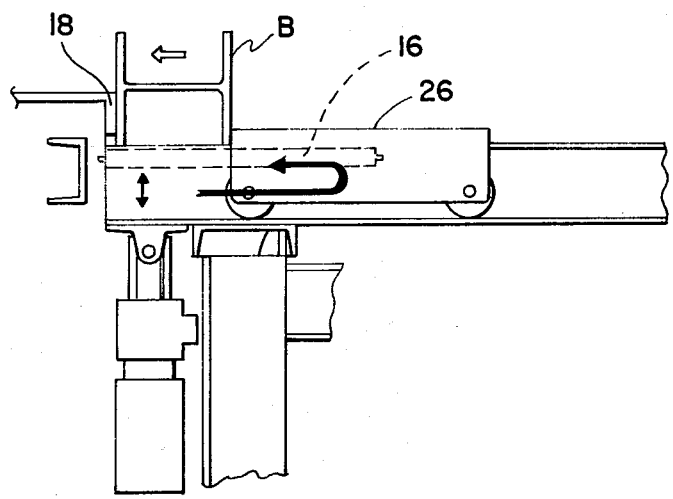
Figure 2A:
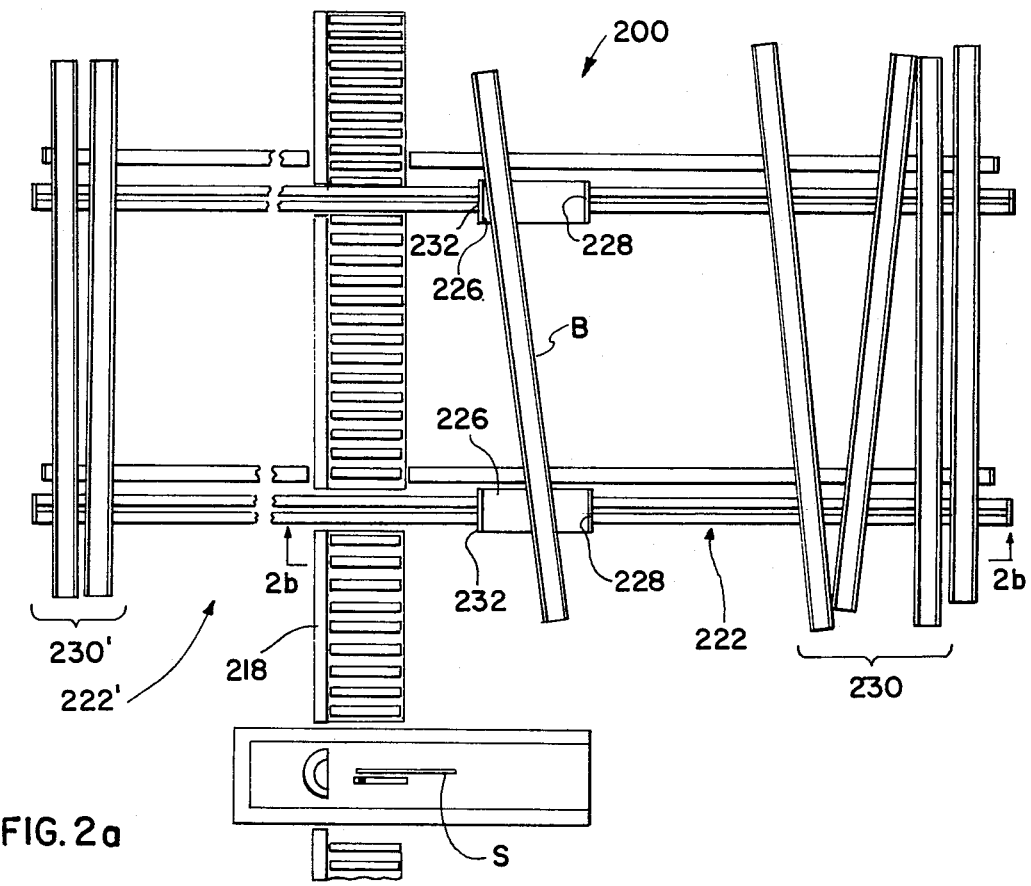
Figure 2B:
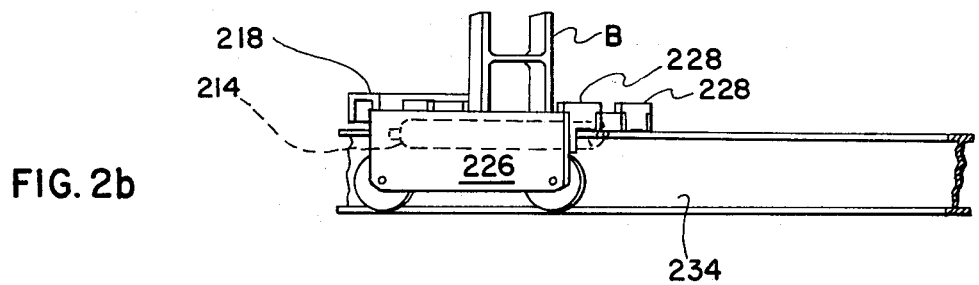
Figure 2C:
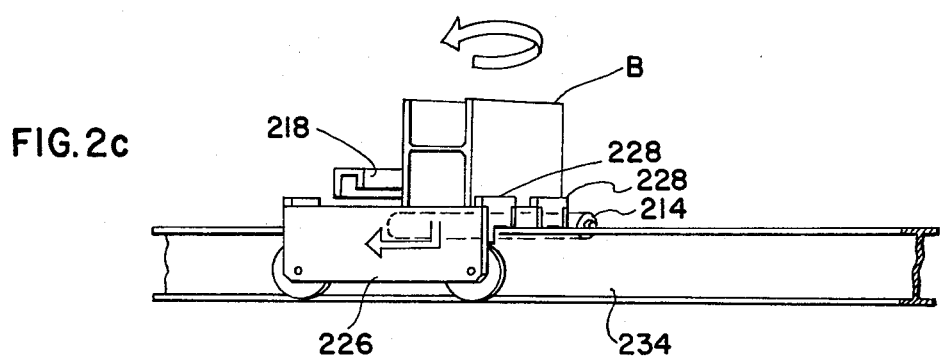
Figure 2D:
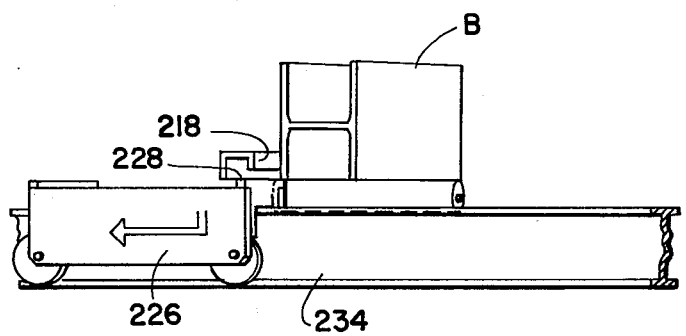
Figure 3A:
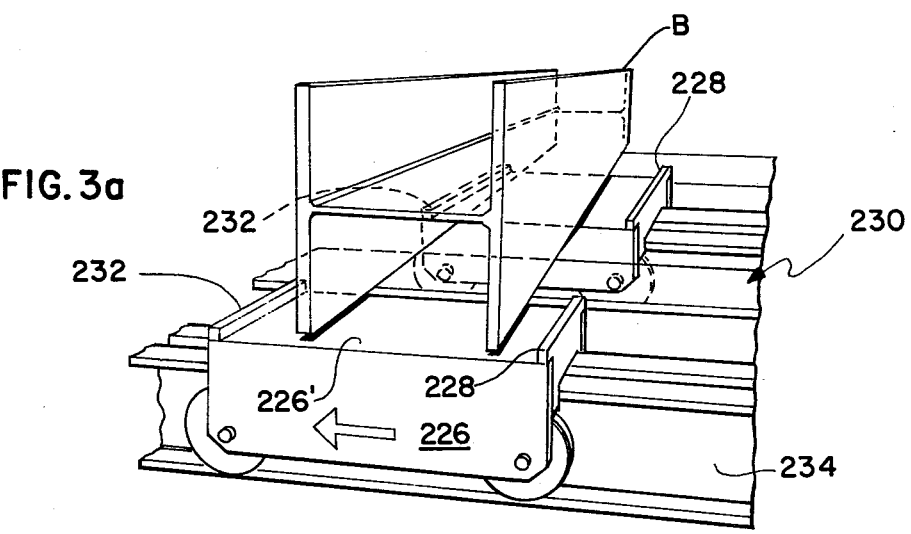
Figure 3B:
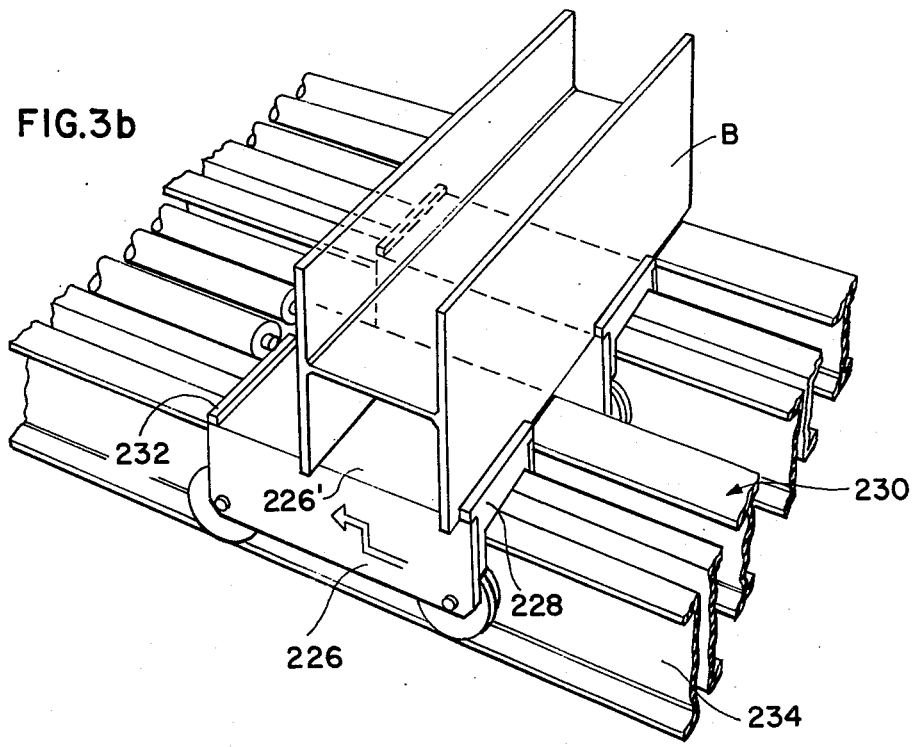
Figure 3C:
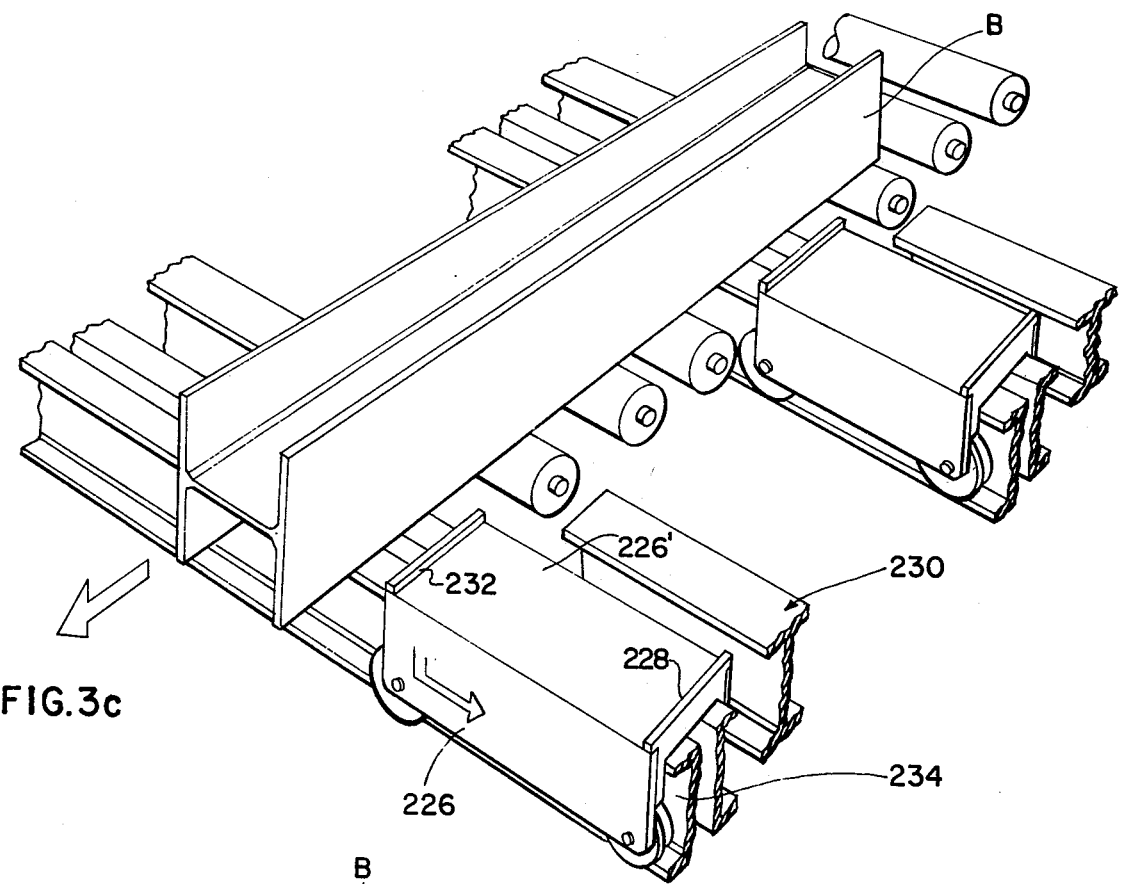
Figure 4:
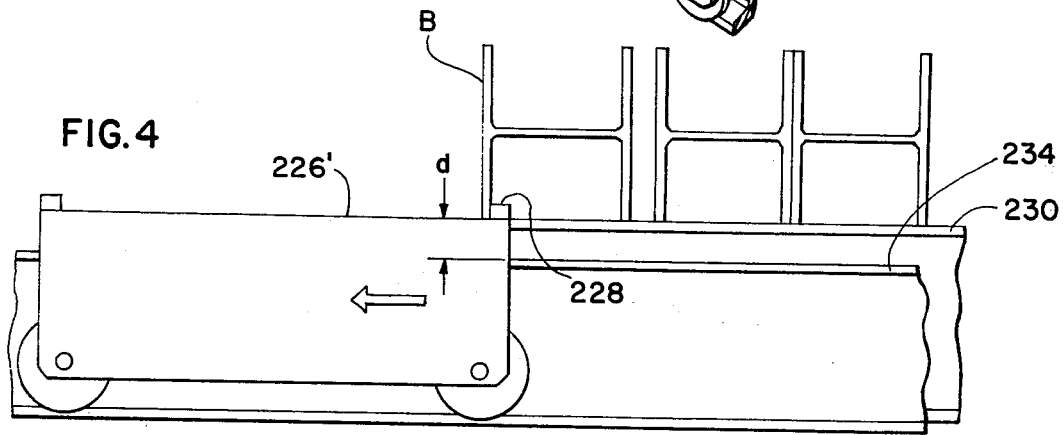

The above and other objects and advantages of the invention will become more readily apparent on examination of the following description, including the drawings, in which:

FIG. 1 is an isometric view of old art;
FIG. 1b is a side elevational detail of old art adapted from 1b—1b, FIG. 1, with the elements in a different position;
FIG. 2a is a plan view;
FIGS. 2b, 2c and 2d are elevational details;
FIGS. 3a, 3b and 3c are isometric details; and
FIG. 4 is a side elevational detail.

OLD ART, FIGS. 1a and 1b

FIG. 1a shows a roller conveyor 16 for conveying structural beams B longitudinally (arrow) to a saw S for cutting to length. A guide 18 along one side of the roller conveyor provides a reference for aligning the beams for proper clamping in vise V at the saw, for precise length measuring beyond the saw, and for precise cutoff at the saw. Similar alignment requirements apply regardless of whether the operation to be performed is sawing, punching, drilling, milling, or the like.

The beams, as delivered for cross-conveying, by overhead crane C or other suitable means, rest in storage generally parallel with the roller conveyor on a storage table 20 extending perpendicular from the side of the roller conveyor as part of cross-conveyor system 22.

Cross-conveyor systems such as that shown preferably include two or more synchronized elevatable rails or tracks 24 having on them respective wagons 26 aligned and synchronized for coordinate travel across the respective rails. In a sense the plural tracks and wagons may thus be considered as acting as one track and wagon.

In operation, the cross-conveyor system sequentially picks up beams from the storage table on the wagon 26, which conveys them to the roller conveyor, deposits them on the rollers and returns for another beam, all under operator direction.

A second cross-conveyor system 22' similar to the first may be provided on the discharge side of the saw for off-loading the cut sections of beams from the roller conveyor continuation 16'. Length measuring is preferably provided by a system L, located along the side of the roller conveyor continuation, as described in U.S. Pat. No. 3,841,462 for LENGTH MEASURER FOR ELONGATE MATERIALS granted Oct. 15, 1974, to the present inventor.

FIG. 1b, a detail adopted from 1b—1b, FIG. 1, shows the old art method of forcing a beam B picked up on the beds of wagons 26 to align with the guide 18, if found to be misaligned with the roller conveyor 16 when set down on it. After the wagons set the beam down on the rollers of the conveyor they then, under further direction of the operator, retract (arrow) toward the storage area until clear of the beam, rise until the forward edges of the wagons position for laterally pushing the beam, reverse direction and advance against the beam, forcing the beam to slide across the rollers until fully against the guide. The wagons then descend and retract to a position beneath the next beam on the storage table, and repeat the cycle of beam transport.

THE IMPROVEMENTS OF THIS INVENTION

FIG. 2a shows in plan view a system 200 similar to the old-art system just described, but improved by provision of an upright flange 228 on the end of wagon 226 closer to the beam storage area 230.

In addition, as a coacting feature the cross-conveyor system 222 as constructed extends through the roller conveyor at least a distance permitting the wagons 226 to advance to a position at which the narrowest beam B or other elongate member being handled can be forcibly clamped between the flange 228 and the guide 218 to align the beam. For narrow members such as rods this may require near co-alignment of the flange 228 and guide. This feature can permit a single flange of an "H" beam to be held. Such may be desirable when holding very lightweight beams across the entire beam width might cause distortion during fabrication operations.

Preferably a second flange 232 is provided on the opposite end of the wagon also. This prevents beams from sliding off regardless of the direction in which the wagons accelerate. With on-edge "H" beams, if desirable to align the beams in storage, as in closing gaps in a parallel series of beams, or if beams must otherwise be slid after setting down, the leading edge flange can be employed for this with least time required for wagon transit.

FIG. 2b, 2c and 2d, adapted from 2b—2b, FIG. 2, diagram successive stages of alignment of a beam B carried on a wagon 226 against guide 218 of the roller conveyor. The wagons advance in raised, or beam-transporting, position, on cross-conveyor rail 234 through roller conveyor 214 which the cross-conveyor system more or less interrupts until flanges 228 on the respective wagons force the length of beam B against guide 218. The wagons then lower in synchronism, depositing the beam on the rollers without necessity of sliding the beam on the rollers to align the beam.

When clear of the beam the wagon can continue without reversal to the second beam storage area (shown at 230', FIG. 2a) for pickup of a beam to be deposited on the rollers in turn, or, if desired, can return to the first beam storage area for the same purpose.

If the second beam storage area is used, the wagon elevation system must provide for additional lift of a few inches amplitude to clear the plane of the tops of the wagons over the guide. In lifting beams from the second beam-storage area over the rail and aligning them against the guide, wagon travel reversal will be necessary, but again alignment advantageously precedes set-down of the beam onto the rollers.

FIGS. 3a, 3b and 3c show a further advantage of the flanged wagon feature. The upright-face flanges 228, 232, protrude about one-half inch above the plane of the wagon beds 226'.

With the wagon bed surface below the level of the beam storage table 230 and the wagon flanges 228, 232, protruding above the beam storage table level, a beam B can be aligned in the storage area prior to pickup. In this position of wagon-elevation, the operator causes the wagons to advance until the wagon flanges force the beam into square orientation, then causes the wagons to pick up the beam, transport it and deposit it on the conveyor. Using this method, the beams can be set down in close alignment on a roller way regardless of whether the roller way has a guide.

FIG. 4 illustrates a further advantage of the flange construction. Wagons so equipped can hook the flange 228 of the wagon behind the near flange of a beam B stored in contact with other beams and drag the selected beam away from the other beams, making beam-separation for pickup easy and positive.

Preferably the flanges of the wagons extend full width so that they tend to square-up behind lengths of beam too short to reach between wagons. In addition, they are preferably welded throughout, to withstand best the hooking and clamping loads, in contrast with extending-and-retracting mechanisms found in some types of material handling devices which might be considered for this application.

As noted, the through cross-conveyor arrangements provides the advantage of loading from both sides of the roller conveyor. This Figure also illustrates a feature of the invention making feasible use of the through-cross-conveyor relation as opposed to the old-art arrangement in which the cross-conveyor does not pass completely through the roller conveyor to a second storage location, shown in the first Figure.

In the preferred embodiment the tops of the rollers lie in the plane of the storage table 230. Dimension d measured from the top of the cross-conveyor rail or track 234 to the top of the wagon bed is made greater than in the first Figure; the dimension is at least equal to the height of guide rail above the top of the storage table and rollers. This effectively lowers the operating height of the wagon rail 230 an amount preventing it from lifting beams in storage on the storage table when the longer stroke necessary to raise the wagons above the guard rail is used.

For safety, uniformity, ease and economy, all wagons in a system are made to have this feature when one through cross-conveyor is used, regardless of whether the remainder of the cross conveyors may end at the roller conveyor.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by U.S. letters patent is:

1. In a system having a conveyor with a guide therealong for transporting beams and the like lengthwise to a work station, and having a cross-conveyor system including: a storage table for holding a plurality of beams to be transported, a track adjacent to the storage table and perpendicularly intersecting at least a portion of the conveyor, a wagon on the track, the wagon having a bed with one end thereof disposed away from the conveyor and a second end disposed toward the conveyor, and means for sequentially lifting beams with the wagon from the storage table, carrying beams on the wagon to the conveyor, and lowering beams from the wagon onto the conveyor including means for raising and lowering at least the wagon bed, the improvement comprising: means on the wagon for positively separating a beam from a plurality of beams juxtaposed on the storage table and for positively aligning a beam carried on the wagon with the conveyor prior to said lowering thereof from the wagon onto the conveyor, including upright flange structure on said one end of the wagon bed for laterally engaging and moving a beam on the storage table with said at least the wagon bed in partially raised position, and for forcing against the guide a beam carried to the conveyor on the wagon prior to lowering of the beam from the wagon onto the conveyor.

2. In a system having a conveyor with a guide therealong for transporting beams and the like lengthwise to a work station, and having a cross-conveyor system including: a storage table for holding a plurality of beams to be transported, a track adjacent to the storage table and perpendicularly intersecting at least a portion of the conveyor, a wagon on the track, and means including means for raising at least a portion of the wagon for sequentially lifting beams with the wagon from the storage table, carrying beams on the wagon to the conveyor, and lowering beams from the wagon onto the conveyor, the improvement comprising: means on the wagon for positively separating a beam from a plurality of beams juxtaposed on the storage table and for positively aligning a beam carried on the wagon with the conveyor prior to said lowering thereof from the wagon onto the conveyor, comprising upright structure on said at least a portion of the wagon for laterally engaging and moving a beam on the storage table with said at least a portion of the wagon in partially raised position, and for forcing against the guide a beam carried to the conveyor on the wagon prior to lowering of the beam from the wagon onto the conveyor, said at least a portion of the wagon including a bed disposed along the track with a first end facing toward the conveyor and a second end facing away from the conveyor, and said upright structure comprising a flange fixed on said second end of the bed.

3. In a system as described in claim 2, the flange being transverse to the bed of the wagon.

4. In a system as recited in claim 3, a second said flange fixed on the first end of the bed.

5. In a system having a conveyor with a guide therealong for transporting beams and the like lengthwise to a work station, and having a cross-conveyor system including: a storage table for holding a plurality of beams to be transported, a track adjacent to the storage table and perpendicularly intersecting at least a portion of the conveyor, a wagon on the track, and means including means for raising at least a portion of the wagon for sequentially lifting beams with the wagon from the storage table, carrying beams on the wagon to the conveyor, and lowering beams from the wagon onto the conveyor, the improvement comprising: means on the wagon for positively separating a beam from a plurality of beams juxtaposed on the storage table and for positively aligning a beam carried on the wagon with the conveyor prior to said lowering thereof from the wagon onto the conveyor, the track extending through the conveyor, generally forming a cross with the conveyor in plan view; a said storage table proximate the track on each side of the conveyor, said at least a portion of the wagon including a bed disposed along the track and having first and second ends, and said means on the wagon including upright structure comprising a first flange fixed on the first end of the bed and a second flange fixed on the second end of the bed, whereby the wagon can carry a beam in one direction to the conveyor, positively align the conveyed beam against the guide, then set the beam down in alignment on the conveyor and continue in said one direction, leaving the conveyor without reversing.

6. In combination, a conveyor, a cross-conveyor passing through at least a portion of the conveyor, a storage table adjacent the cross-conveyor, the cross-conveyor having wagon structure elevatable and depressable for picking up elongate beams and the like from the storage table and carrying them to and depositing them on the conveyor, an upright flange on at least one end of the wagon structure; the amplitude of said elevation and depression of the wagon structure being proportioned for passing said flange beneath said an elongate beam on the storage table with the wagon structure depressed, thereafter for permitting the flange to engage a lateral portion of said an elongate beam and to urge it into orientation parallel with the conveyor with the wagon structure partially elevated, and thereafter for the wagon structure to pick up said an elongate beam and carry it and deposit it in said orientation onto the conveyor.

7. In the combination recited in claim 6, the conveyor having a guide parallel therewith, the wagon structure having an end adjacent the conveyor and an end opposite the conveyor, the flange being on the end of the wagon structure opposite the conveyor, the cross-conveyor passing through the conveyor a distance permitting the wagon to pass along the cross-conveyor and orient said an elongate beam when carried on the wagon structure against the guide prior to said deposit onto the conveyor.

8. In the combination recited in claim 6, means for accomplishing said elevation and depression of the wagon structure including: a track movably mounting the wagon structure, the track oriented generally transversely to the conveyor, means for elevating and depressing the track; the conveyor having a guide disposed generally parallel thereto and above the level of the storage table; the wagon structure including a wagon bed above the track, the distance of the wagon bed above the track being at least equal to the distance said guide is disposed above the level of the storage table.

9. In a system as recited in claim 1, a said upright flange structure on said second end of the wagon bed.

* * * * *